(12) United States Patent
Hong et al.

(10) Patent No.: US 9,141,232 B2
(45) Date of Patent: Sep. 22, 2015

(54) TOUCH SCREEN PANEL AND DETECTING METHOD OF TOUCH POSITION USING THE SAME

(71) Applicant: Samsung Display Co., Ltd., Yongin (KR)

(72) Inventors: Won-Ki Hong, Suwon-si (KR); Seung-Won Park, Seoul (KR); Jong Seo Lee, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/251,188

(22) Filed: Apr. 11, 2014

(65) Prior Publication Data
US 2015/0109259 A1 Apr. 23, 2015

(30) Foreign Application Priority Data

Oct. 23, 2013 (KR) .................. 10-2013-0126514

(51) Int. Cl.
*G06F 3/0488* (2013.01)
*G06F 3/042* (2006.01)
*G06F 3/043* (2006.01)

(52) U.S. Cl.
CPC ............ *G06F 3/0421* (2013.01); *G06F 3/0436* (2013.01); *G06F 2203/04104* (2013.01); *G06F 2203/04109* (2013.01)

(58) Field of Classification Search
CPC .................... G06F 3/0436; G06F 3/0488
See application file for complete search history.

(56) References Cited

U.S. PATENT DOCUMENTS

| 6,091,406 | A | 7/2000 | Kambara et al. |
| 7,103,460 | B1* | 9/2006 | Breed .................. 701/32.9 |
| 7,786,983 | B2 | 8/2010 | Graham |
| 7,995,039 | B2 | 8/2011 | Eliasson et al. |
| 8,023,780 | B2 | 9/2011 | Juni |
| 8,120,595 | B2 | 2/2012 | Kukulj et al. |
| 8,456,447 | B2 | 6/2013 | Newton |
| 2010/0060612 | A1 | 3/2010 | Jeon et al. |
| 2010/0109850 | A1* | 5/2010 | Kovach et al. ......... 340/10.32 |
| 2012/0138676 | A1* | 6/2012 | Ma et al. ............... 235/379 |
| 2012/0229422 | A1 | 9/2012 | Hwang et al. |

FOREIGN PATENT DOCUMENTS

| JP | 2005-092527 | 4/2005 |
| KR | 10-2010-0088305 | 8/2010 |
| KR | 10-2011-0043872 | 4/2011 |

* cited by examiner

*Primary Examiner* — Ricardo L Osorio
(74) *Attorney, Agent, or Firm* — Cantor Colburn LLP

(57) ABSTRACT

A touch screen panel includes: a wave guide; a first transmitter at a first end of the wave guide to output an ultrasonic or light wave into the wave guide; a second transmitter at a second end of the wave guide to output the ultrasonic or light wave into the wave guide; a first receiver at the first end to receive the ultrasonic or light wave from the second transmitter and generate a first receipt signal; a second receiver at the second end to receive the ultrasonic or light wave and generate a second receipt signal; and a controller connected to the first receiver and the second receiver to detect a touch position on the wave guide using a time difference between a time point at which the first receipt signal is varied and a time point at which the second receipt signal is varied.

20 Claims, 12 Drawing Sheets

TOUCH SCREEN PANEL AND DETECTING METHOD OF TOUCH POSITION USING THE SAME

This application claims priority to Korean Patent Application No. 10-2013-0126514 filed on Oct. 23, 2013, and all the benefits accruing therefrom under 35 U.S.C. §119, the contents of which are incorporated by reference herein in its entirety.

BACKGROUND (a) Field

Exemplary embodiments of the invention relate to a touch screen panel and a touch position detecting method using the touch screen panel, and more particularly, to a touch screen panel including a wave guide and a touch position detecting method using the touch screen panel.

(b) Description of the Related Art

A touch screen panel is an input device for inputting a user's command by recognizing a position a touch thereon by the user. The touch screen panel is typically provided on a front side of a display device to identify a position which is touched by a hand or an object to determine an input signal. The touch screen panel may be implemented in various types, e.g., a resistive type, a capacitive type, an infrared type or an ultrasonic type, for example.

The resistive touch screen panel typically includes upper and lower electrodes formed of a conductive film spaced at a distance from each other using a spacer, and allows the spaced electrodes to contact each other by a touch of a user to sense a position that is touched by the user by measuring resistance caused by the contact.

The capacitive touch screen panel may sense a change of electrostatic capacity formed between an electrode and a conductive object such as a finger of a user.

In general, the resistive touch screen panel and the capacitive touch screen panel are widely used.

However, recently, the size of a display device has become very large, and it may be difficult to apply a resistive touch screen panel and a capacitive touch screen panel to the very large-sized display device. Further, the resistive touch sensor panel and the capacitive touch sensor panel includes fine electrode patterns, and difficulty in process and possibility of defect occurrence may be increased when the fine electrode patterns are formed on a large area.

In the meantime, an infrared touch sensor panel using an infrared sensor and an ultrasonic wave touch sensor panel using an ultrasonic wave sensor may not detect multi-touches. To detect multi-touches, an increased number of sensors may be used, and the manufacturing cost of touch screen panels may be thereby increased.

SUMMARY

Exemplary embodiments of the invention provide a touch screen panel and a touch position detecting method using the touch screen panel, which senses multi-touches and has reduced manufacturing cost.

An exemplary embodiment of the invention provides a touch screen panel including: a wave guide; a first transmitter disposed at a first end of the wave guide and which outputs one of an ultrasonic wave and a light wave into the wave guide; a second transmitter disposed at a second end of the wave guide and which outputs one of the ultrasonic wave and the light wave into the wave guide; a first receiver disposed at the first end of the wave guide which receives one of the ultrasonic wave and the light wave form the second transmitter and generates a first receipt signal; a second receiver disposed at the second end of the wave guide and which receives the one of the ultrasonic wave and the light wave from the first transmitter and generates a second receipt signal; and a controller connected to the first receiver and the second receiver and which detects a touch position on the wave guide using a time difference between a first time point at which the first receipt signal is varied and a second time point at which the second receipt signal is varied.

In an exemplary embodiment, the wave guide may include a material having a refractive index which is different from a refractive index of external air.

In an exemplary embodiment, the wave guide may include a transparent glass material or a transparent plastic material.

In an exemplary embodiment, the wave guide may have a tube shape substantially in a zigzag shape which overlaps a surface of the touch panel.

In an exemplary embodiment, the wave guide may have a width of about 2 millimeters (mm) or less.

In an exemplary embodiment, a space between adjacent extending portions of the zigzag shape of the wave guide may be filled with air.

In an exemplary embodiment, the space between extending portions of the zigzag shape of the wave guide may be filled with an index matching material having a refractive index which is less than the refractive index of the material of the wave guide.

In an exemplary embodiment, the first receiver and the second receiver may receive the one of the ultrasonic wave and the light wave totally reflected and transferred through the wave guide.

In an exemplary embodiment, the controller may detect the touch position as a position away from a middle position of the wave guide by a distance which is obtained by multiplying the time difference between the first time point and the second time point by a speed of the ultrasonic wave or the light wave.

In an exemplary embodiment, the first transmitter and the second transmitter may output the one of the ultrasonic wave and the light wave as a continuous wave.

In an exemplary embodiment, the first transmitter and the second transmitter may output the one of the ultrasonic wave and the light wave as a pulse wave.

In an exemplary embodiment, the first transmitter and the second transmitter may output the one of the ultrasonic wave and the light wave with different frequencies.

In an exemplary embodiment, the first transmitter and the second transmitter may output the one of the ultrasonic wave and the light wave with a frequency hopping method.

In an exemplary embodiment, the first receiver and the second receiver may use frequency modulation which modifies the one of the ultrasonic wave and the light wave to have a predetermined amplitude.

In an exemplary embodiment, the controller may detect one touch position using a time difference between an earliest time point among time points at which the first receipt signal is varied and a latest time point among time points at which the second receipt signal is varied, and the controller may detect another touch position using a time difference between a second earliest time point among the time points at which the first receipt signal is varied and a second latest time point among the time points at which the second receipt signal is varied.

In an exemplary embodiment, the controller may detect a touch pressure on the wave guide by detecting magnitudes of the first receipt signal and the second receipt signal which are varied.

Another exemplary embodiment of the invention provides a method of detecting a touch position on a touch screen panel including: receiving a first ultrasonic wave transferred from a first end of a wave guide of the touch screen to a second end thereof; receiving a second ultrasonic wave transferred from the second end of a wave guide to the first end thereof; generating a first receipt signal based on the first ultrasonic wave generating a second receipt signal based on the second ultrasonic wave; and detecting a touch position on the wave guide using a time difference between a first time point at which the first receipt signal is varied and a second time point at which the second receipt signal is varied.

In an exemplary embodiment, the detecting the touch position on the wave guide may include detecting the touch position as a position away from a middle position of the wave guide by a distance which is obtained by multiplying the time difference between the first time point and the second time point by a speed of the first and second ultrasonic waves.

In an exemplary embodiment, the detecting the touch position on the wave guide may include detecting one touch position using a time difference between an earliest time point among time points at which the first receipt signal is varied and a latest time point among time points at which the second receipt signal is varied, and detecting another touch position using a time difference between a second earliest time point the time points at which the first receipt signal is varied and a second latest time point among the time points at which the second receipt signal is varied.

In an exemplary embodiment, the method may further include detecting a touch pressure on the wave guide by detecting magnitudes of the first receipt signal and the second receipt signal which are varied.

In accordance with exemplary embodiments of the invention, it is possible to reduce a manufacturing cost of the touch screen panel by using a small number of sensors which can sense multi-touches.

BRIEF DESCRIPTION OF THE DRAWINGS

The above and other features of the invention will become more apparent by describing in detail exemplary embodiments thereof with reference to the accompanying drawings, in which.

DETAILED DESCRIPTION

Figure 1:
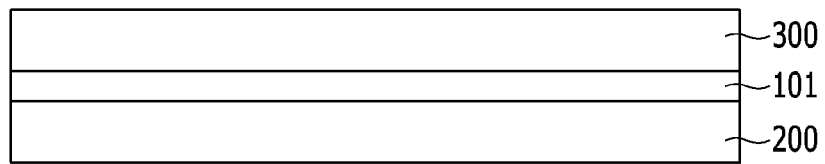
FIG. 1 is a cross-sectional view of an exemplary embodiment of a display device, in accordance with the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of a display device, according to the invention, will be described with reference to the accompanying drawings.

Figure 2:
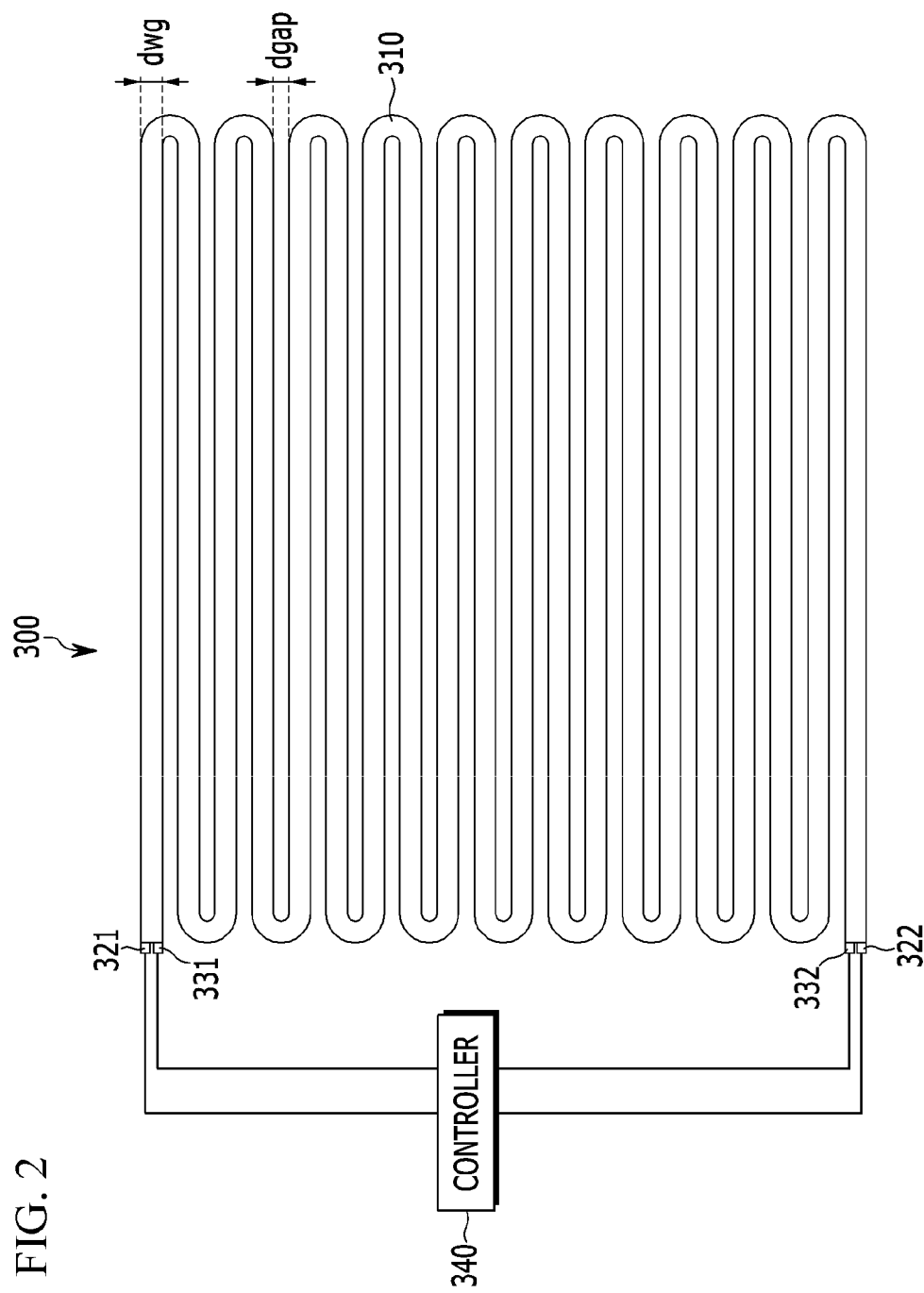
FIG. 2 is a top plan view of an exemplary embodiment of a touch screen panel, in accordance with the invention.

FIG. 1 is a cross-sectional view of an exemplary embodiment of a display device, in accordance with the invention. FIG. 2 is a top plan view of an exemplary embodiment of a touch screen panel, in accordance with the invention.

Referring to FIGS. 1 and 2, an exemplary embodiment of the display device includes a display panel 200 and a touch screen panel 300 disposed on the display panel 200. An adhesive layer 101 is provided between the display panel 200 and the touch screen panel 300 to facilitate adhesion between the display panel 200 and the touch screen panel 300. In an exemplary embodiment, the adhesive layer 101 may include an optical clear adhesive ("OCA").

The display panel 200 includes a plurality of display elements. The display elements may be a display element of an organic light emitting display ("OLED"), a liquid crystal display ("LCD"), an electroluminescent display ("ELD"), or a plasma display panel ("PDP"), for example. In one exemplary embodiment, for example, the display panel 200 may be one of the OLED, the LCD, the ELD and the PDP.

In an exemplary embodiment, as shown in FIG. 2, the touch screen panel 300 includes a wave guide 310, transmitters 321 and 322 disposed at opposing ends of the wave guide 310, respectively, receivers 331 and 332 disposed at the opposing ends of the wave guide 310, respectively, and a controller 340.

In an exemplary embodiment, the wave guide 310 may have a shape of a tube in a zigzag shape which covers a top surface of the display panel 200. In one exemplary embodiment, for example, the wave guide 310 may be formed in such a way to extend in a direction by a length corresponding to the width of the display panel 200, to bend in the opposite direction and extend by the length corresponding to the width of the display panel 200, and to bend again in a direction and extend by the length corresponding to the width of the display panel 200. In such an embodiment, the bent portions of the wave guide 310 may be disposed in a bezel portion or peripheral portion of the touch screen panel 300 instead of an active region the touch screen panel 300 at which an actual touch is performed. In such an embodiment, extending portions of the wave guide 310 may be disposed in a display area on the display panel 200, while the bent portions of the wave guide 310 may be disposed in a non-display area on the display panel 200.

The shape of one exemplary embodiment of the wave guide 310 is shown in FIG. 2, but the invention is not limited thereto. In an alternative exemplary embodiment, the wave guide 310 may have one of various shapes that cover the top surface of the display panel 200.

The wave guide 310 may include a material having a different refractive index from outside air. In one exemplary embodiment, for example, the wave guide 310 may include a transparent glass material or a transparent plastic material. In such an embodiment, the outside air has a refractive index of about 1, while the glass has a refractive index of about 1.5. The wave guide 310 may have a thickness or width dwg of about 2 millimeters (mm) or less, which may be determined based on accuracy and sensibility of the touch sensing.

A gap or space dgap between adjacent extending portions of the zigzag-shaped wave guide 310, which extend in opposing directions, may be too small to be invisible to naked eyes. A space defined by the gap dgap of the wave guide 310 may be an empty space filled with air. In an alternative exemplary embodiment, the gap dgap of the wave guide 310 may be filled with an index matching material. The index matching material may be a material having a less refractive index than the refractive index of the wave guide 310.

In an exemplary embodiment, a gate line for transmitting a gate signal, a data line for transmitting a data voltage, and a thin film transistor connected to the gate line and the data line may be disposed in the display panel 200, and a black matrix that covers the gate line and the data line may be disposed in a lattice structure in the display panel 200. In such an embodiment, the distances of the gap dgap of the wave guide 310 may be determined based on the position of the black matrix. In such an embodiment, the wave guide 310 may have a shape corresponding to the black matrix such that one line (e.g., one extending portion) of the wave guide 310 is located on one opening defined by the black matrix in the lattice structure and the gap dgap of the wave guide 310 are disposed to cover or overlap the black matrix.

In an exemplary embodiment, the transmitters 321 and 322 include a first transmitter 321 disposed at one end (e.g., a first end) of the wave guide 310 and a second transmitter 322 disposed at another end (e.g., the second end) of the wave guide 310. The first transmitter 321 and the second transmitter 322 may output an ultrasonic wave or a light wave into the wave guide 310. In one exemplary embodiment, for example, each of the first transmitter 321 and the second transmitter 322 may be an inter-digital transducer ("IDT") that converts an electrical signal to an ultrasonic wave and outputs the ultrasonic wave. In an alternative exemplary embodiment, each of the first transmitter 321 and the second transmitter 322 may be a light emitting diode ("LED") that outputs a visible ray or an infrared ray based on an electrical signal provided thereto.

In an exemplary embodiment, the receivers 331 and 332 include a first receiver 331 disposed at one end of the wave guide 310 and a second receiver 332 disposed at the other end of the wave guide 310. The first receiver 331 receives an ultrasonic wave or a light wave which is outputted from the second transmitter 322 and transferred through the wave guide 310. The second receiver 332 receives an ultrasonic wave or a light wave which is outputted from the second transmitter 321 and transferred through the wave guide 310. In one exemplary embodiment, for example, each of the first receiver 331 and the second receiver 332 may be an inter-digital transducer that receives an ultrasonic wave and converts the ultrasonic wave into an electrical signal. In an alternative exemplary embodiment, each of the first receiver 331 and the second receiver 332 may be a photodiode that receives a visible ray or an infrared ray and converting the visible ray or the infrared ray into an electrical signal.

Hereinafter, for convenience of description, an exemplary embodiment, where each of the transmitters 321 and 322 is an inter-digital transducer and each of the receivers 331 and 332 is an inter-digital transducer, will be described in greater detail. In such an embodiment, each of the transmitters 321 and 322, which is an inter-digital transducer, may include a piezoelectric element using lead zirconate titanate ("PZT"), zinc oxide (ZnO), aluminum nitride (AlN), a single crystal, or the like, for example.

In such an embodiment, each of the first transmitter 321 and the second transmitter 322 may output an ultrasonic wave into the wave guide 310 at an angle equal to or greater than about a critical incidence angle. The critical incidence angle indicates an incidence angle at which an ultrasonic wave travels substantially parallel to a boundary surface of the wave guide 310 when a refractive angle of the ultrasonic wave with respect to the wave guide 100 becomes about 90 degrees. If the incidence angle becomes greater than the critical incidence angle, all ultrasonic wave energy is reflected, which is called as a total reflection. Ultrasonic waves of which incidence angles are greater than the critical incidence angle are totally reflected in the wave guide 310 to be transferred.

An ultrasonic wave outputted from the first transmitter 321 and totally reflected in the wave guide 310 is transferred to the second receiver 332. An ultrasonic wave outputted from the second transmitter 322 and totally reflected in the wave guide 310 is transferred to the second receiver 332. Each of the first receiver 331 and the second receiver 332 generates an electrical signal corresponding to intensity of the ultrasonic wave to transfer the electrical signal to the controller 340.

In an exemplary embodiment, the controller 340 is connected to each of the transmitters 321 and 322, and the receivers 331 and 332 to control operations thereof. The controller 340 may transmit electrical signals to the transmitters 321 and 322 to control ultrasonic wave output therefrom. The controller 340 may receive a first electrical signal from the first receiver 331 and a second electrical signal from the second receiver 332, and detect a touch position on the wave guide 310 using a time difference between a first time point at which the first electrical signal is varied and a second time point at which the second electrical signal is varied. The controller 340 may detect a touch pressure by detecting magnitude of the electrical signals which is varied by a touch.

Hereinafter, an exemplary embodiment of a method for detecting a touch position using the touch screen panel 300 will be described.

Figure 3:
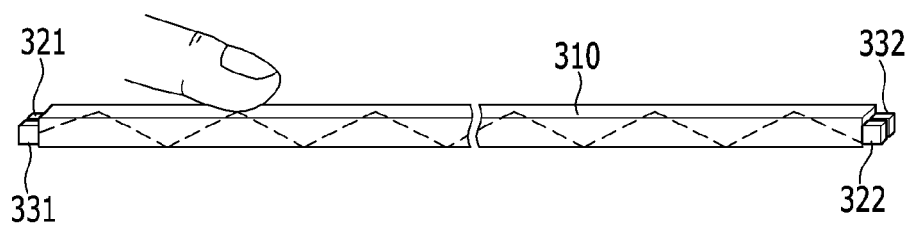
FIG. 3 is a schematic view showing a principle by which a single touch position is sensed in an exemplary embodiment of the touch screen panel, in accordance with the invention.
Figure 4:
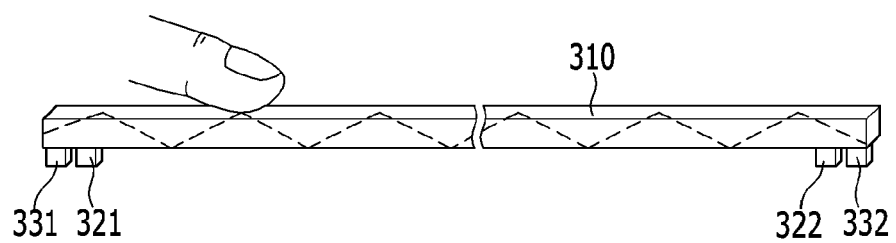
FIG. 4 is a schematic view showing a principle by which a single touch position is sensed in an alternative exemplary embodiment of the touch screen panel, in accordance with the invention.
Figure 5:
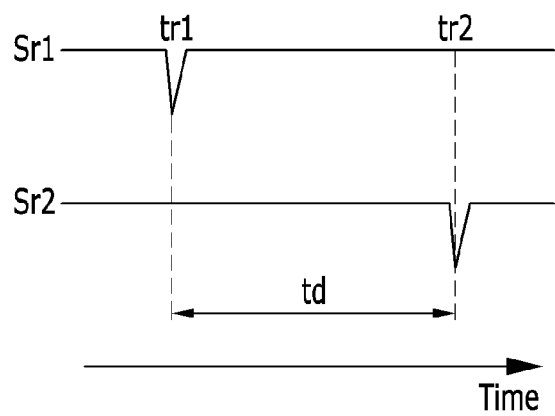
FIG. 5 is a waveform diagram showing a receipt signal generated by a single touch in an exemplary embodiment of the touch screen panel, in accordance with the invention.
Figure 6:
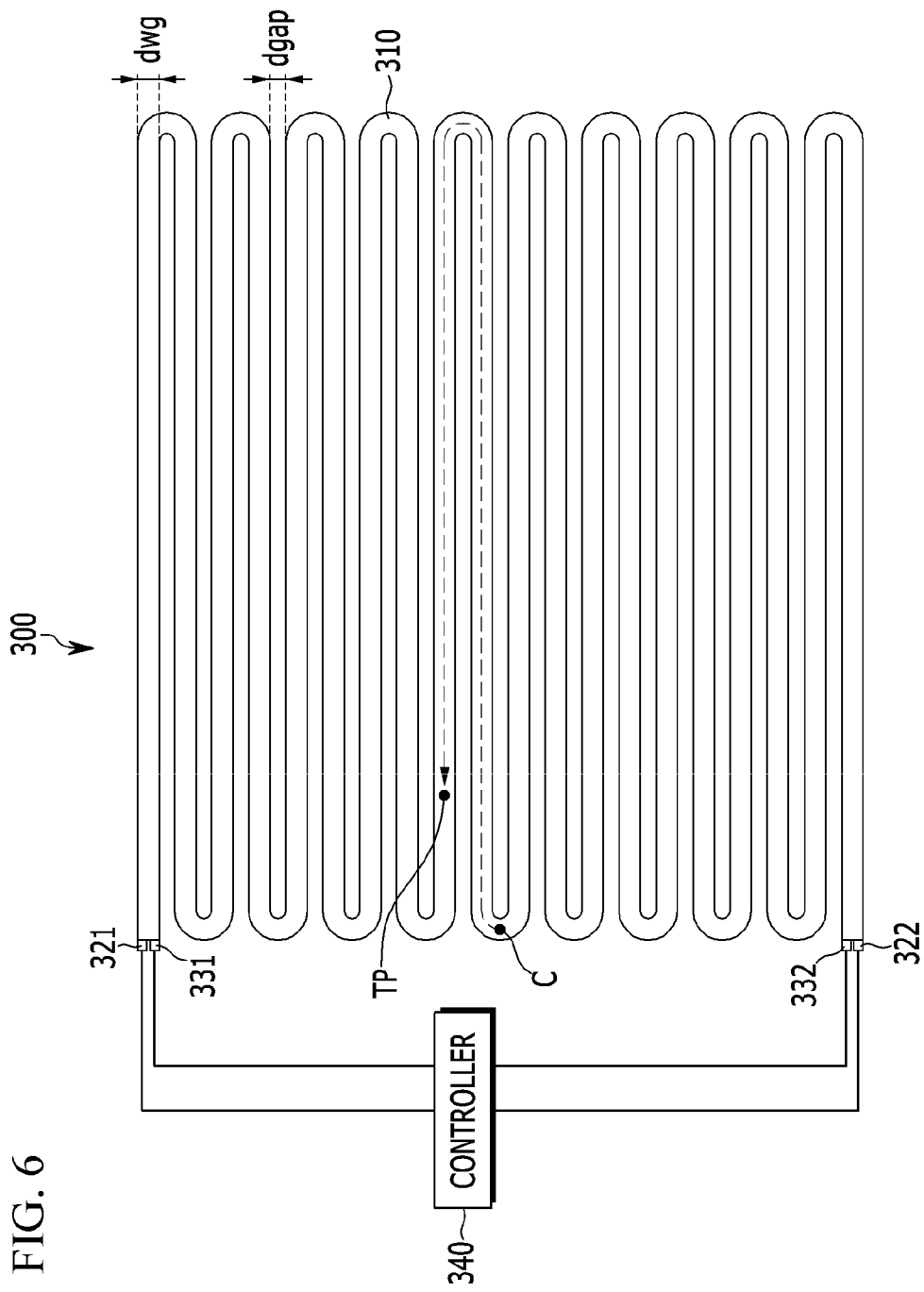
FIG. 6 is a top plan view of the touch screen panel shown in FIG. 3, showing an exemplary embodiment of a process in which a touch position of a single touch in the touch screen panel is determined, in accordance with the invention.

FIG. 3 is a schematic view showing a principle by which a single touch position is sensed in an exemplary embodiment of the touch screen panel, in accordance with the invention. FIG. 4 is a schematic view showing a principle by which a single touch position is sensed in an alternative exemplary embodiment of the touch screen panel having a different arrangement of a receiver and a transmitter, in accordance with the invention. FIG. 5 is a waveform diagram showing a receipt signal generated by a single touch in an exemplary embodiment of the touch screen panel, in accordance with the invention. FIG. 6 is a top plan view of the touch screen panel shown in FIG. 3, showing an exemplary embodiment of a process in which a touch position of a single touch in the touch screen panel is determined, in accordance with the invention.

For convenience of illustration and description, the illustration of the detailed shape of the wave guide 310 is omitted from FIGS. 3 and 4, and FIGS. 3 and 4 show one end of the wave guide 310 at which the first transmitter 321 and the first receiver 331 are disposed and the other end of the wave guide 310 at which the second transmitter 322 and the second receiver 332 are disposed.

In an exemplary embodiment, as shown in FIG. 3, the first transmitter 321 and the first receiver 331 may be disposed at a side surface of one end of the wave guide 310, and the second transmitter 322 and the second receiver 332 may be disposed at a side surface of the other end of the wave guide 310.

In an alternative exemplary embodiment, as shown in FIG. 4, the first transmitter 321 and the first receiver 331 may be disposed at a bottom surface of one end of the wave guide 310, and the second transmitter 322 and the second receiver 332 may disposed at a bottom surface of the other end of the wave guide 310.

In another alternative exemplary embodiment, the transmitters 321 and 322 and the receivers 331 and 332 may be respectively disposed at side surfaces, bottom surfaces, or top surfaces of opposite ends of the wave guide 310 to detect a touch position using an exemplary embodiment of a method of detecting the touch position.

Hereinafter, an exemplary embodiment of a method of detecting the touch position will be described.

As shown in FIG. 3 or 4, when a point on the wave guide 310 is touched by a finger, a difference in refractive indexes of the wave guide 310 and outside air is varied at the point touched by the finger, and thus the intensity of an ultrasonic wave transferred through the wave guide 310 is varied.

In one exemplary embodiment, for example, where the wave guide 310 has a refractive index of about 1.5 and the outside air has a refractive index of about 1, the difference between the refractive indexes is about 0.5. However, when the wave guide 310 is touched at a point by a finger having a refractive index greater than the refractive index of the outside air, the refractive index difference between the wave guide 310 and the finger is less than about 0.5 at the touched point. Accordingly, the total reflection of ultrasonic waves is not performed at the touched point, and thus some of the ultrasonic wave energy leaks at the touched point to the outside of the wave guide 310 such that the intensity of the ultrasonic waves transmitted to the receivers 331 and 332 is reduced. The reduced intensity of the ultrasonic waves causes a decrease in the magnitude of electrical signals generated in the receivers 331 and 332. Similarly, when the finger is taken off of the wave guide 310, the intensity of the ultrasonic waves transferred to the receivers 331 and 332 is increased to the original state, and thus the magnitude of the electrical signals generated in the receivers 331 and 332 is increased.

Hereinafter, an electrical signal generated in the first receiver 331 is referred to as a first receipt signal Sr1, and an electrical signal generated in the second receiver 332 is referred to as a second receipt signal Sr2.

In an exemplary embodiment, a time difference between a first time point at which the first receipt signal Sr1 is varied and a second time point at which the second receipt signal Sr2 is varied occurs based on a position of the touched point. In such an embodiment, a point of time at which a variation in intensity of an ultrasonic wave is detected is varied depending on the position of the touched point.

In one exemplary embodiment, for example, when the touched point is close to the first receiver 331, the first receipt signal Sr1 is first varied at a first time point tr1, and the second receipt signal Sr2 is varied at a second time tr2.

The position of the touched point on the wave guide 310 may be detected using a time difference td between the first time point tr1 at which the first receipt signal Sr1 is varied and the second time point tr2 at which the second receipt signal Sr2 is varied. In an exemplary embodiment, the position of the touched point on the wave guide 310 may be detected using the time difference td between the points of time at which the variation in intensity of the ultrasonic wave is detected by the first receiver 331 and the second receiver 332.

In an exemplary embodiment, a position of the touched point may be calculated based on the following Equation 1.

$$TP = C - \frac{tr2 - tr1}{2} \times V \quad \text{Equation 1}$$

In Equation 1, TP denotes the position of the touched point, C denotes a middle position of an entire length of the wave guide 310, tr1 denotes a time point at which the first receipt signal Sr1 is varied by the touch, tr2 denotes a time point at which the second receipt signal Sr2 is varied by the touch, and V denotes a speed of the ultrasonic wave.

In an exemplary embodiment, as shown in FIG. 5, when the first receipt signal Sr1 is first varied, and the second receipt signal Sr2 is varied after a predetermined time td, the position TP is calculated as a position moved by a distance of $$\frac{tr2 - tr1}{2} \times V$$

from the middle point C of the wave guide 310 in a negative direction.

In an exemplary embodiment, as shown in FIG. 6, the negative direction from the middle point C of the wave guide 310 is the direction toward one end of the wave guide 310 or the first receiver 331. A positive direction from the middle point C of the wave guide 310 is the direction toward the other end of the wave guide 310 or the second receiver 332.

As such, the position TP from the middle position C of the wave guide 310 may be calculated using the Equation 1, and defined in a xy coordinates on the touch screen panel 300.

FIG. 5 shows the first receipt signal Sr1 and the second receipt signal Sr2 which are generated with uniform magnitudes and are varied depending on the touch position in an exemplary embodiment where the ultrasonic waves outputted from the first transmitter 321 and the second transmitter 322 are continuous waves. In such an embodiment, the first transmitter 321 and the second transmitter 322 can output the ultrasonic waves as continuous waves.

In an alternative exemplary embodiment, the first transmitter 321 and the second transmitter 322 may output the ultrasonic wave as pulse waves. In such an embodiment, the pulse waves may be ultrasonic waves of which intensity is varied with a predetermined cycle.

In another alternative exemplary embodiment, the first transmitter 321 and the second transmitter 322 may output ultrasonic waves in the frequency hopping method to effectively prevent noise from being generated due to interference between ultrasonic waves outputted from the first transmitter 321 and the second transmitter 322. In one exemplary embodiment, for example, the first transmitter 321 and the second transmitter 322 may output ultrasonic waves with different types of frequencies or by varying frequencies thereof according to a specific pattern to effectively prevent interference therebetween from being generated.

In an exemplary embodiment, the transmitters 321 and 322 and the receivers 331 and 332 may employ frequency modulation to remove noise generated in propagation of ultrasonic waves. In one exemplary embodiment, for example, the noise generated in propagation of ultrasonic waves may be removed by allowing the first transmitter 321 and the second transmitter 322 to output ultrasonic waves having predetermined amplitudes and the first receiver 331 and the second receiver 332 to modify the received ultrasonic waves into predetermined magnitudes.

Figure 7:
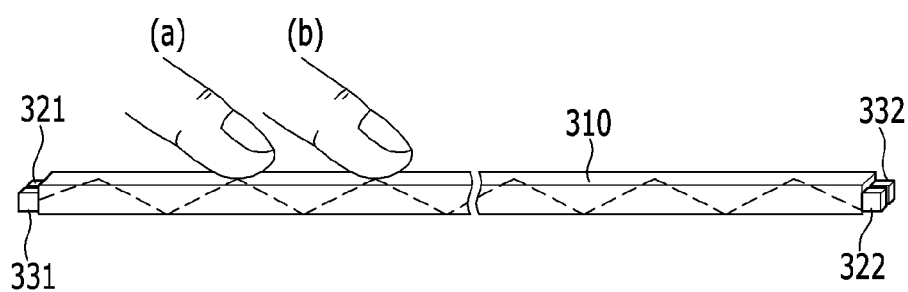
FIG. 7 is a schematic view showing a principle by which a dual touch position is sensed in an exemplary embodiment of the touch screen panel, in accordance with the invention.
Figure 8:
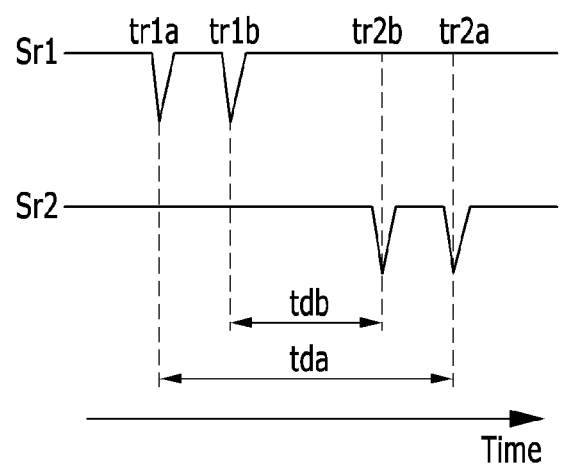
FIG. 8 is a waveform diagram showing a receipt signal generated by a dual touch in an exemplary embodiment of the touch screen panel, in accordance with the invention.

FIG. 7 is a schematic view showing a principle by which a dual touch position is sensed in an exemplary embodiment of the touch screen panel, in accordance with the invention. FIG. 8 is a waveform diagram showing a receipt signal generated by a dual touch in an exemplary embodiment of the touch screen panel, in accordance with the invention.

In an exemplary embodiment, as shown in FIG. 7, two points (a) and (b) on the wave guide 310 may be touched.

The first receipt signal Sr1 is varied at a time point tr1a and a time point tr1b, and the second receipt signal Sr2 is varied at a time point tr2b and a time point tr2a. The variation of the first receipt signal Sr1 at the time point tr1a and the variation of the second receipt signal Sr2 at the time point tr2a are generated by the touch of the point (a). The variation of the first receipt signal Sr1 at the time point tr1b, and the variation of the second receipt signal Sr2 at the time point tr2b are generated by the touch of the point (b).

In an exemplary embodiment, a position of the touched point (a) on the wave guide 310 may be calculated using a time difference tda between the time point tr1a as the earliest time point among the time points at which the first receipt signal Sr1 is varied and the time point tr2a as the latest time point among the time points at which the second receipt signal Sr2 is varied.

In such an embodiment, a position of the touched point (b) on the wave guide 310 may be calculated using a time difference tdb between the time point tr1b as the second earliest time point among the time points at which the first receipt signal Sr1 is varied and the time point tr2b as the second latest time point among the time points at which the second receipt signal Sr2 is varied.

In such an embodiment, two positions of the touched points (a) and (b) may be calculated using the following Equation 2.

$$TPa = C - \frac{tr2a - tr1a}{2} \times V \quad \text{Equation 2}$$

$$TPb = C - \frac{tr2b - tr1b}{2} \times V$$

In Equation 2, TPa denotes the position of the touched point (a), TPb denotes the position of the touched point (b), C denotes a middle position of an entire length of the wave guide 310, tr1a denotes a time point at which the first receipt signal Sr1 is varied by the touch of the point (a), tr2a denotes a time point at which the second receipt signal Sr2 is varied by the touch of the point (a), tr1b denotes a time point at which the first receipt signal Sr1 is varied by the touch of the point (b), tr2b denotes a time point at which the second receipt signal Sr2 is varied by the touch of the point (b), and V denotes a speed of the ultrasonic wave.

The positions of the touched points (a) and (b) from the middle position C of the wave guide 310 may be calculated using Equation 2, and defined in the xy coordinates on the touch screen panel 300.

Figure 9:
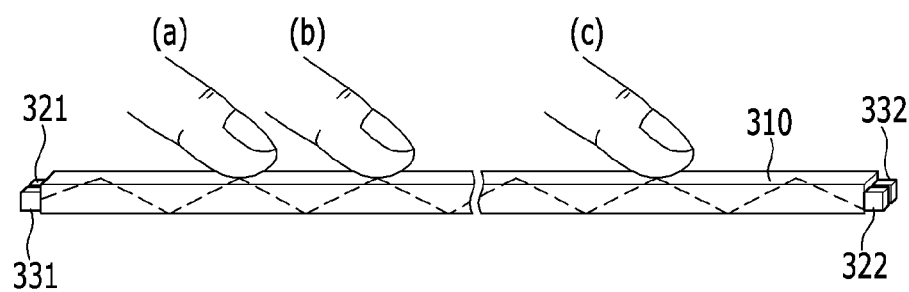
FIG. 9 is a schematic view showing a principle by which a triple touch position is sensed in an exemplary embodiment of the touch screen panel, in accordance with the invention.
Figure 10:
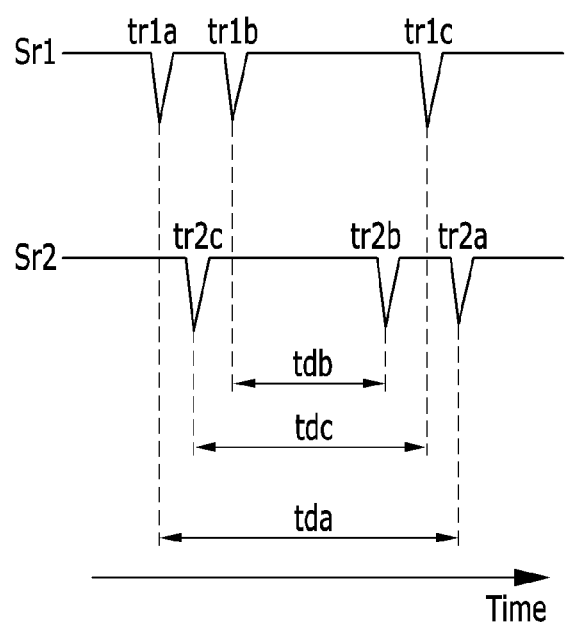
FIG. 10 is a waveform diagram showing a receipt signal generated by a triple touch in an exemplary embodiment of the touch screen panel, in accordance with the invention.

FIG. 9 is a schematic view showing a principle by which a triple touch position is sensed in an exemplary embodiment of the touch screen panel, in accordance with the invention. FIG. 10 is a waveform diagram showing a receipt signal generated by a triple touch in an exemplary embodiment of the touch screen panel, in accordance with the invention.

In an exemplary embodiment, as shown in FIG. 9 three points (a), (b) and (c) on the wave guide 310 may be touched.

The first receipt signal Sr1 is varied at time points tr1a, tr1b and tr1c, and the second receipt signal Sr2 is varied at time points tr2c, tr2b and tr2a. The variation of the first receipt signal Sr1 at the time point tr1a and the variation of the second receipt signal Sr2 at the time point tr2a are generated by the touch of the point (a). The variation of the first receipt signal Sr1 at the time point tr1b and the variation of the second receipt signal Sr2 at the time point tr2b are generated by the touch of the point (b). The variation of the first receipt signal Sr1 at the time point tr1 c and the variation of the second receipt signal Sr2 at the time point tr2c are generated by the touch of the point (c).

In such an embodiment, a position of the touched point (a) on the wave guide 310 may be calculated using a time difference tda between the time point tr1a as the earliest time point among the time points at which the first receipt signal Sr1 is varied and the time point tr2a as the latest time point among the time points at which the second receipt signal Sr2 is varied.

In such an embodiment, a position of the touched point (b) on the wave guide 310 may be calculated using a time difference tdb between the second time point tr1b as the second earliest time point among the time points at which the first receipt signal Sr1 is varied and the time point tr2b as the second latest time point among the time points at which the second receipt signal Sr2 is varied.

In such an embodiment, a position of the touched point (c) on the wave guide 310 may be calculated using a time difference tdc between the time point tr1c as the third earliest time point among the time points at which the first receipt signal Sr1 is varied and the time point tr2c as the third latest time point among the time points at which the second receipt signal Sr2 is varied.

In such an embodiment, three positions of the touched points (a), (b) and (c) may be calculated using the following Equation 3.

$$TPa = C - \frac{tr2a - tr1a}{2} \times V$$
$$TPb = C - \frac{tr2b - tr1b}{2} \times V$$
$$TPc = C - \frac{tr2c - tr1c}{2} \times V$$

Equation 3

In Equation 3, TPa denotes the position of the touched point (a), TPb is the position of the touched point (b), TPc denotes the position of the touched point (c), C denotes a middle position of an entire length of the wave guide 310, tr1a denotes a time point at which the first receipt signal Sr1 is varied by the touch of the point (a), tr2a denotes a time point at which the second receipt signal Sr2 is varied by the touch of the point (a), tr1b denotes a time point at which the first receipt signal Sr1 is varied by the touch of the point (b), tr2b denotes a time point at which the second receipt signal Sr2 is varied by the touch of the point (b), tr1 c denotes a time point at which the first receipt signal Sr1 is varied by the touch of the point (c), tr2c denotes a time point at which the second receipt signal Sr2 is varied by the touch of the point (c), and V denotes a speed of the ultrasonic wave.

The positions of the touched points (a), (b) and (c) from the middle position C of the wave guide 310 may be calculated using Equation 3, and defined in the xy coordinates on the touch screen panel 300.

As described above, when the first receipt signal Sr1 and the second receipt signal Sr2 are varied at two or more points by multi-touch of two or more touches, one touch position is calculated using the time difference between the earliest time point among the time points at which the first receipt signal Sr1 is varied and the latest time point among the time points at which the second receipt signal Sr2 is varied. Anther touch position is calculated using the time difference between the second earliest time point among the time points at which the first receipt signal Sr1 is varied and the second latest time point among the time points at which the second receipt signal Sr2 is varied. Yet another touch position is calculated using the time difference between the third earliest time point among the time points at which the first receipt signal Sr1 is varied and the third latest time point among the time points at which the second receipt signal Sr2 is varied. In such a way, a plurality of touch positions may be calculated in an exemplary embodiment.

Figure 11:
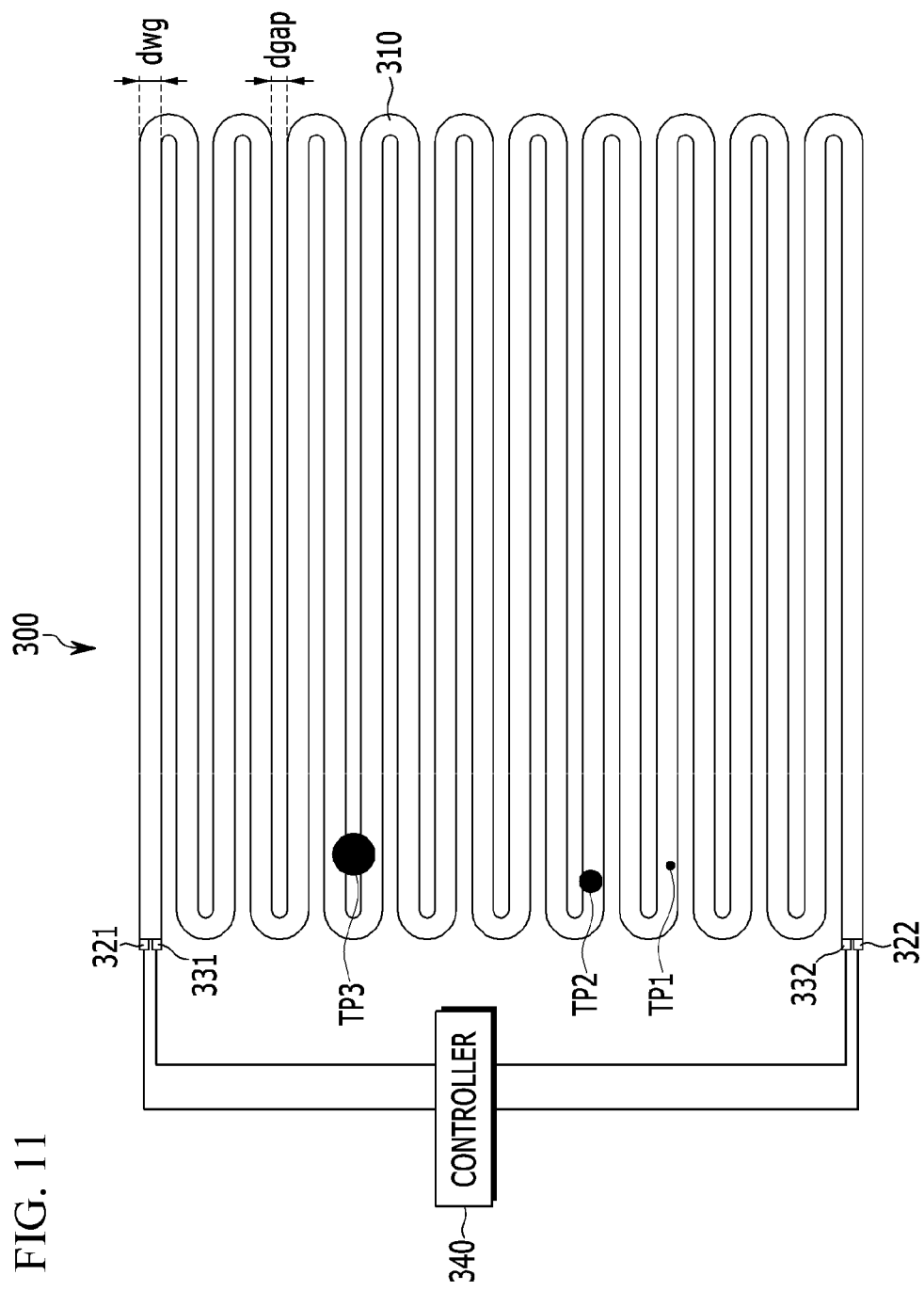
FIG. 11 is a schematic top plan view of the touch screen panel shown in FIG. 3, showing an exemplary embodiment of a process in which a touch pressure is detected in the touch screen panel, in accordance with the invention.

FIG. 11 is a schematic top plan view of the touch screen panel shown in FIG. 3, showing an exemplary embodiment of a process in which a touch pressure is detected in the touch screen panel, in accordance with the invention.

Referring to FIG. 11, in an exemplary embodiment, when the touch screen panel 300 is pushed by a finger, the touch pressure may be substantially proportional to an area of the touched point. As the area of the touched point increases, an area at which total reflection is not performed and ultrasonic wave energy leaks to the outside of the wave guide 310 also increase. In such an embodiment, when the area of the touched point increase, intensity of the ultrasonic waves received by the receivers 331 and 332 is reduced, and magnitude of electrical signals generated by the receivers 331 and 332 is thereby reduced.

In one exemplary embodiment, for example, the variations of the electrical signals generated by the receivers 331 and 332 and detected at a second touched point TP2 having a wide area may be greater than the variations of the electrical signals generated by the receivers 331 and 332 and detected at a first touched point TP1 having a narrow area.

Accordingly, in such an embodiment, the touch pressure on the wave guide 310 may be detected by detecting the magnitude of variations in the electrical signals generated by the receivers 331 and 332.

In an exemplary embodiment, when a third touched point TP3 is located to stretch over two or more adjacent lines of the wave guide 310, the third touched point TP3 may be detected using the aforementioned method for detecting multi-touch. The third touched point TP3 detected as the multi-touch may be recognized as a touched point having a wide area, and thus the touch pressure may be detected.

Figure 12:
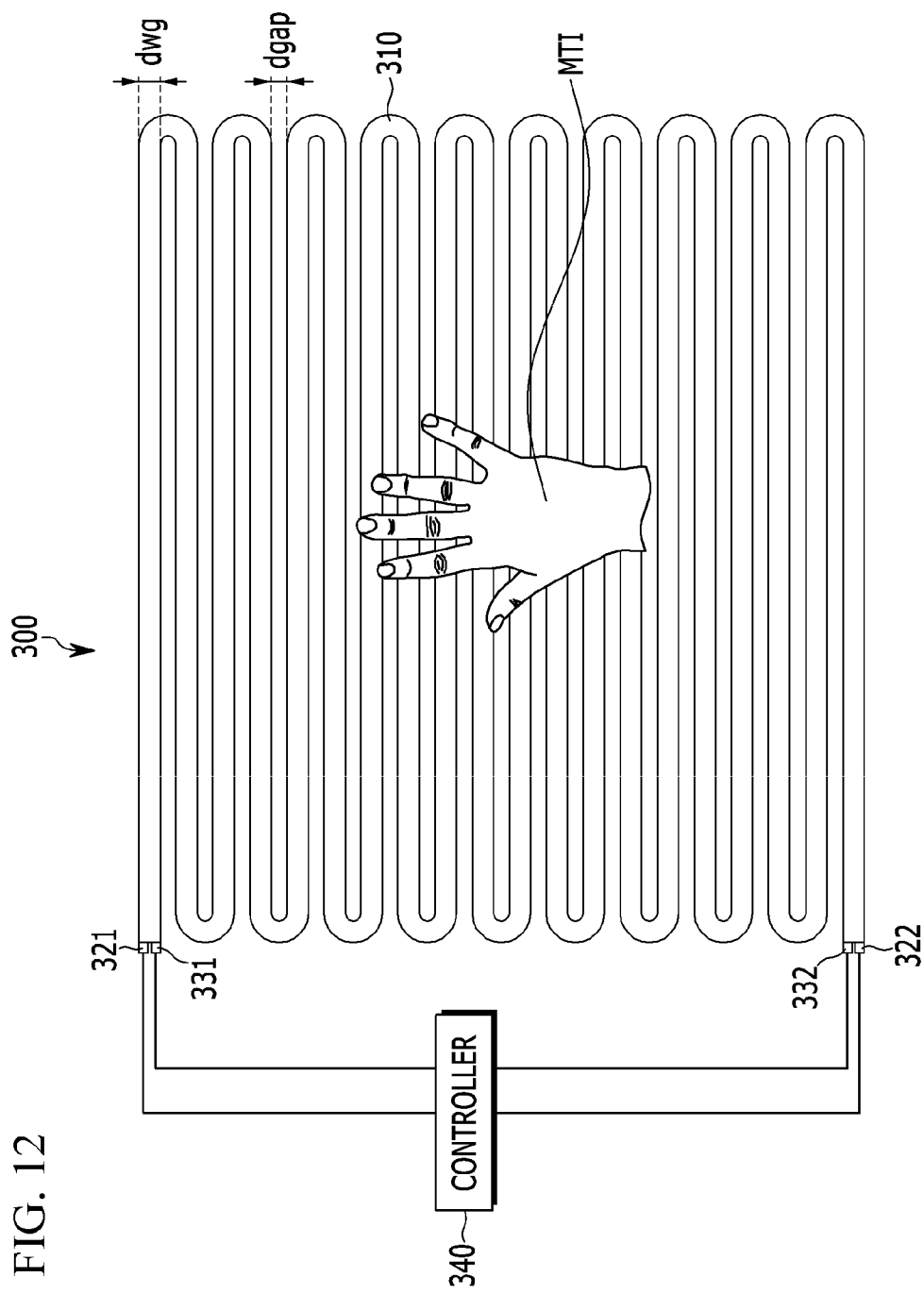
FIG. 12 is a schematic top plan view of the touch screen panel shown in FIG. 3, showing an exemplary embodiment of a process in which a multi-touch image is detected in the touch screen panel, in accordance with the invention.

FIG. 12 is a schematic top plan view of the touch screen panel shown in FIG. 3, showing an exemplary embodiment of a process in which a multi-touch image is detected in the touch screen panel, in accordance with the invention.

Referring to FIG. 12, in an exemplary embodiment, a multi-touch image ("MTI") may be detected using the multi-touch detecting method and the touch pressure detecting method. In such an embodiment, the touch screen panel 300 may be used as an image scanner.

As described above, a touch on the touch screen panel 300 may occur by a finger, but not being limited thereto. In an exemplary embodiment, the touch screen panel 300 may detect a touch by any object that changes the total reflection on the wave guide 310, e.g., a pointer used for touching the touch screen panel 300 or various kinds of objects including the finger. In one exemplary embodiment, for example, a touch pen and the like which changes the total reflection on the wave guide 310 may be used as the pointer.

In an exemplary embodiment, as described above, the touch position on an exemplary embodiment of the touch screen where the transmitters 321 and 322 and the receivers 331 and 332 are provided is detected using the ultrasonic wave. In an alternative exemplary embodiment, the touch position may be detected in touch screen where the transmitters 321 and 322 and the receivers 331 and 332 use light waves. When the transmitters 321 and 322 and the receivers 331 and 332 use the light waves, frustrated total internal reflection ("FTIR") inside the wave guide 310 is used to detect the touched position. In such an embodiment, Brewster's law may be used. Brewster's law indicates that reflected light has no polarization component perpendicular to a reflection surface. In such an embodiment, when the wave guide 310 is touched, an amount of light reflected through the wave guide 310 is changed. In an alternative exemplary embodiment, a wire grid pattern may be used. The wire grid pattern is used to remove a polarization component of reflected light by forming a grid in a range of about 300 nanometers (nm) to about 700 nm on an external wall of the wave guide 310. In such an embodiment, when the wave guide 310 is touched, an amount of light reflected through the wave guide 310 is changed.

While exemplary embodiments of the invention have been particularly shown and described with reference to the accompanying drawings, the specific terms used herein are used for the purpose of describing the invention and are not intended to define the meanings thereof or be limiting of the scope of the invention set forth in the claims. Therefore, those skilled in the art will understand that various modifications and other equivalent embodiments of the invention are possible. Consequently, the true technical protective scope of the invention must be determined based on the technical spirit of the appended claims.

What is claimed is:

1. A touch screen panel comprising:
a wave guide;
a first transmitter disposed at a first end of the wave guide and which outputs one of an ultrasonic wave and a light wave into the wave guide;
a second transmitter disposed at a second end of the wave guide and which outputs the one of the ultrasonic wave and the light wave into the wave guide;
a first receiver disposed at the first end of the wave guide and which receives the one of the ultrasonic wave and the light wave from the second transmitter and generates a first receipt signal;
a second receiver disposed at the second end of the wave guide and which receives the one of the ultrasonic wave and the light wave from the first transmitter and generates a second receipt signal; and
a controller connected to the first receiver and the second receiver and which detects a touch position on the wave guide using a time difference between a first time point at which the first receipt signal is varied and a second time point at which the second receipt signal is varied.

2. The touch screen panel of claim 1, wherein the wave guide comprises a material having a refractive index which is different from a refractive index of air.

3. The touch screen panel of claim 2, wherein the wave guide comprises a transparent glass material or a transparent plastic material.

4. The touch screen panel of claim 2, wherein the wave guide has a tube shape having a zigzag shape which overlaps a surface of the touch screen panel.

5. The touch screen panel of claim 4, wherein the wave guide has a width of about 2 millimeters or less.

6. The touch screen panel of claim 5, wherein a space between two adjacent extending portions of the zigzag shape of the wave guide is filled with air.

7. The touch screen panel of claim 5, wherein a space between adjacent extending portions of the zigzag shape of the wave guide is filled with an index matching material having a refractive index which is less than the refractive index of the material of the wave guide.

8. The touch screen panel of claim 7, wherein the first receiver and the second receiver receive the one of the ultrasonic wave and the light wave totally reflected and transferred through the wave guide.

9. The touch screen panel of claim 1, wherein the controller detects the touch position as a position away from a middle position of the wave guide by a distance which is obtained by multiplying the time difference between the first time point and the second time point by a speed of the ultrasonic wave or the light wave.

10. The touch screen panel of claim 1, wherein the first transmitter and the second transmitter output the one of the ultrasonic wave and the light wave as a continuous wave.

11. The touch screen panel of claim 1, wherein the first transmitter and the second transmitter output the one of the ultrasonic wave and the light wave as a pulse wave.

12. The touch screen panel of claim 11, wherein the first transmitter and the second transmitter output the one of the ultrasonic wave and the light wave with different frequencies.

13. The touch screen panel of claim 12, wherein the first transmitter and the second transmitter output the one of the ultrasonic wave and the light wave with a frequency hopping method.

14. The touch screen panel of claim 11, wherein the first receiver and the second receiver use frequency modulation which modifies the one of the ultrasonic wave and the light wave to have a predetermined amplitude.

15. The touch screen panel of claim 1, wherein
the controller detects one touch position using a time difference between an earliest time point among time points at which the first receipt signal is varied and a latest time point among time points at which the second receipt signal is varied, and
the controller detects another touch position using a time difference between a second earliest time point among the time points at which the first receipt signal is varied and a second latest time point among the time points at which the second receipt signal is varied.

16. The touch screen panel of claim 1, wherein the controller detects a touch pressure on the wave guide by detecting magnitudes of the first receipt signal and the second receipt signal which are varied.

17. A method of detecting a touch position on a touch screen panel, the method comprising:
- receiving a first ultrasonic wave transferred from a first end of a wave guide of the touch screen panel to a second end of the wave guide;
- receiving a second ultrasonic wave transferred from the second end of the wave guide to the first end of the wave guide;
- generating a first receipt signal based on the first ultrasonic wave;
- generating a second receipt signal based on the second ultrasonic wave; and
- detecting a touch position on the wave guide using a time difference between a first time point at which the first receipt signal is varied and a second time point at which the second receipt signal is varied.

18. The method of claim 17, wherein the detecting the touch position on the wave guide comprises detecting the touch position as a position away from a middle position of the wave guide by a distance which is obtained by multiplying the time difference between the first time point and the second time point by a speed of the first and second ultrasonic waves.

19. The method of claim 17, wherein the detecting the touch position on the wave guide comprises:
- detecting one touch position using a time difference between an earliest time point among time points at which the first receipt signal is varied and a latest time point among time points at which the second receipt signal is varied; and
- detecting another touch position using a time difference between a second earliest time point among the time points at which the first receipt signal is varied and a second latest time point among the time points at which the second receipt signal is varied.

20. The method of claim 17, further comprising:
- detecting a touch pressure on the wave guide by detecting magnitudes of the first receipt signal and the second receipt signal which are varied.

* * * * *